Sept. 18, 1928.
F. PRASZKEWIZ
SECONDARY TRACTOR PROPELLING DEVICE
Filed July 27, 1925 4 Sheets-Sheet 1
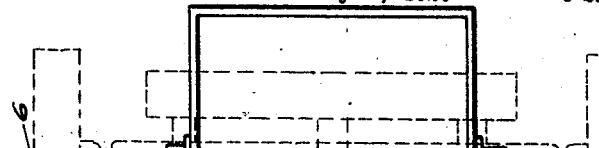

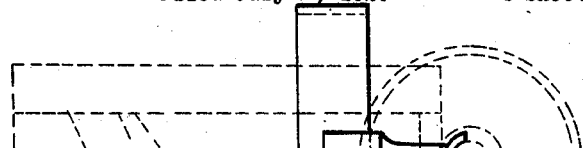

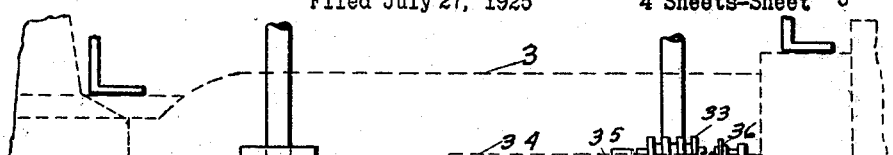

Patented Sept. 18, 1928.

1,684,969

UNITED STATES PATENT OFFICE.

FRANK PRASZKEWIZ, OF DETROIT, MICHIGAN.

SECONDARY-TRACTOR-PROPELLING DEVICE.

Application filed July 27, 1925. Serial No. 46,263.

The object of my invention is to provide a secondary propelling device that can readily be adapted to an ordinary tractor, providing a pair of secondary driving wheels that can be readily substituted for the heavily lugged drive wheels ordinarily used on tractor engines, but without requiring any changing of the wheels.

Another object is to provide a secondary propelling device for tractors, that can be applied under load, for propelling the tractor over the ground without distroying the vegetation growing thereon, as usually results when the heavily lugged tractor drive wheels are used.

A further object is to provide a secondary propelling device for tractors, or similar power machines, providing a wide, flat rimmed wheel in place of the tractor drivers, for carrying the tractor load, and a pair of secondary plate lugged propelling wheels that can be raised and lowered for engaging the soil, for propelling the tractor over the soil.

These several objects are attained in the preferred form by the construction and arrangement of parts more fully hereinafter set forth.

Similar parts on all drawings are marked by similar numerals.

Fig. 1, shows a plan view of my device applied to a tractor engine, and the general arrangement of parts.

Fig. 2, is a side view of the device as attached to the tractor, showing the relative position of the parts and the driving means for operating the device.

Fig. 3, is a sectional view on line —AA— of Fig. 1, showing the lifting mechanism and means for operating same.

Fig. 4, is a top view of the parts shown in Fig. 3.

Fig. 8, is an alternate form of propelling wheel used where the weight of the tractor is borne by the wide flat rimmed wheels on the tractor drive.

Figure 5:
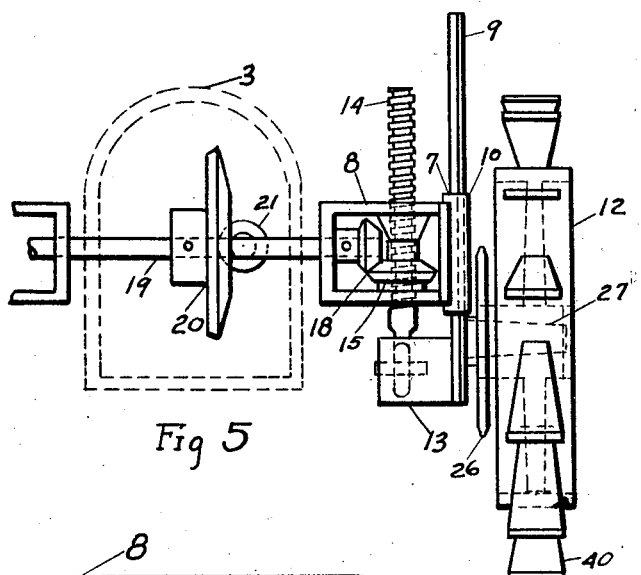
Fig. 5, is a sectional view taken on line —BB— of Fig. 1, showing the driving gearing and operating mechanism.
Figure 6:
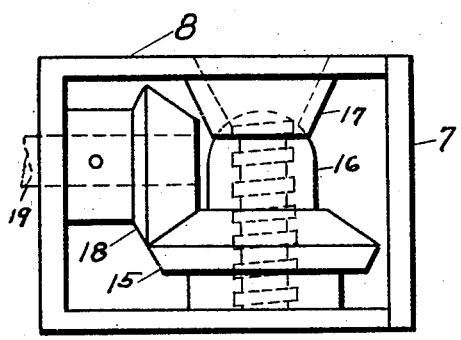
Fig. 6, is an enlarged detail of the lifting gears and bearing support for side adjusting of the lifting screw.
Figure 7:
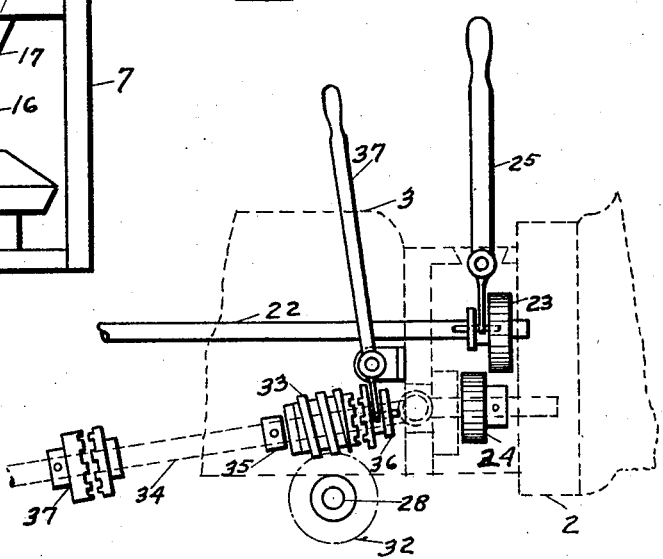
Fig. 7, is a sectional view taken on line —CC— of Fig. 1, showing a detail of the driving means.

I will now describe more fully the detailed construction of my device referring to the drawings and marks thereon.

The general construction of my device comprises a pair of secondary driving wheels, placed inside of and adjacent to the rear driving wheels of the tractor, and attached to the tractor frame, by means of vertical slides placed on each side of the tractor, and having one of the secondary propelling wheels mounted on the lower end of each of the said slides, the slides being provided with geared means connected directly with the tractor engine, for raising and lowering the slides and connecting propelling wheels attached thereto. The secondary driving wheels being provided with projecting plate lug bars are lowered until the projecting lugs engage the soil sufficiently to propel the tractor over the soil. The load may rest on the large flat rimmed tractor drivers while being propelled by the secondary driving lug wheel, or it may be carried entirely by the secondary driving wheel if the soil would permit.

Special wheels are provided having a series of flat plate lugs projecting from the outer rim thereof and so arranged as to prevent the tractor load from cutting or destroying the surface of the soil over which it passss.

The tractor to which my device is attached and operates therewith, comprises the ordinary combination of the engine section —1—, transmission section —2—, housing frame —3—, axle —4—, heavily lugged drive wheels —5— and the steering wheels —6—, all combined and connected with the usual gearing and means for operating same as is the general practice in ordinary tractor design. The tractor being propelled by the large heavily lugged drive wheels —5—, by the motor —1— through its connecting gearing in the transmission —2— and axle —4—. To the tractor construction proper as heretofore mentioned, I lay no claim, but merely herein cite its general construction for reference and for more clearly setting forth my device to which it is attached and with which it operates.

Outside the tractor housing —3—, and on each side thereof, is fixedly attached rigid frame bars —7—, positioned horizontally along the sides of the housing section —3—, securely attached thereto, and having bearing boxes —8— formed therein. Outside of each of the side frame bars —7—, adjacent to the bearing box —8—, is an extension slide —9— movably mounted thereon, positioned, approximately at right angles thereto. The slides —9— are held in position by means of grooved slide blocks —10— and —11— fixedly attached to the side frame bar —7—, and engage the grooved edges of the slide —9— and allow same to slide therethrough. At the lower end of the extension slide —9— and pivotally attached thereto, is a secondary driving wheel —12—, so arranged and positioned thereon as to rotate in a plane parallel to the adjacent driving wheel —5— of the tractor. On the inside of the extension slide —9—, at the lower end thereof and opposite the secondary driving wheel —12—, is an extension lifting block —13— formed thereon, and projecting therefrom at right angles to the slide bar. Pivotally connected to the extension block —13— is a threaded lifting screw —14— which passes through openings in the bearing boxes —8— of the frame bar —7—, also at approximately right angles to the frame bar, but free to slide endwise through the openings in the bearing box walls as the attached extension slide moves through its supporting slide blocks —10— and —11—. Mounted on the threaded lifting screw —14— is an internally threaded lifting gear —15—, said gear being free to turn thereon for raising and lowering the lifting screw —14— and the attached slide bar —9—. On the lifting gear —15— is a projecting ball hub —16— formed on the top side thereof for engaging the frame socket —17— in the top wall of the bearing box —8—, for transmitting the tractor load to the lifting gear —15— and screw —14—, also at the same time provide means for a slight angular movement of the lifting screw —14— as the attached extension slide is operated up and down within its supports. Meshing with the lifting gears —15— are the drive gears —18—. Gears —18— are fixedly mounted on a horizontal drive shaft —19— which passes through the tractor housing —3—. The drive shaft —19— being a common drive shaft for both the driving gears —18— having one of said gears attached to each end thereof, is rotatably mounted at each end of the shaft within the bearing box —8—. Near the center of the said drive shaft —19— is a fixedly attached power bevel gear —20— and which meshes with a power pinion gear —21—. The pinion gear —21— is fixedly mounted on the end of the driving shaft —22— which leads directly to the transmission gearing within the tractor transmission casing —2—, and driven directly from the power from the tractor engine and connecting gears, causing a rotation of the lifting gears —15— around the threaded lifting screw —14— thus lowering the extension slide —9— and attached drive wheel —12—. On the housing end of the drive shaft —22— is splined a driving gear —23—, free to slide thereon. Said gear —23— being so positioned thereon as to be engageable with another gear —24— of the tractor transmission gearing, when moved on the supporting shaft —22— by means of the operating lever —25—. The operating lever —25— being pivoted to the engine transmission casing —2—, and provides means for operating the extension slide directly from the power of the tractor engine. Both of the driving gears —18— being fixedly attached to the common shaft —19—, are necessarily rotated in the same direction by the power bevel gear attached to the center thereof —20—, and which requires the threaded lifting screw —14— as positioned on opposite sides of the tractor frame to be right and left hand screws. Fixedly attached to the inner hub of the secondary driving wheel —12— is a large driving sprocket —26—, positioned concentric with the wheel axle pivot —27—. Rotatably mounted mounted across the tractor frame and at right angles thereto, is a power drive shaft —28—, and supported thereon by the extended bearings —29— fixedly attached to the lower side of the frame bars —7—. On both the outer ends of the drive shaft —28— is fixedly attached a drive sprocket —30—, positioned in line with and for turning the large sprocket —26— attached to the hub of the drive wheel —12—, and connected therewith by means of the sprocket chain —31—. Near the center of the driving shaft —28— is mounted a driving worm gear —32—, fixedly attached thereto. Mounted on the main drive shaft —34— of the tractor directly over the worm gear —32—, is a driving worm —33—, said worm meshing with and engaging the worm gear —32—. The worm —33— being loosely mounted on the drive shaft —34— and free to turn thereon, but held in position by the fixed collar —35— attached to the shaft —34—, and is engaged to the drive shaft —34— only by means of a sliding clutch gear —36— splined to the shaft. Said clutch gear —36— being operated by the engaging lever —37— pivoted to the end of the transmission casing —2—. On closing the clutch gear —36— with the worm —33—, the engine power is connected directly with the driving wheels —12— for propelling same. If desired, the main driving wheels —5— of the tractor may be disconnected by means of a secondary clutch arrangement —37— connecting the drive shaft —34—. The secondary wheels —12— being formed with a flat rim —38— and supporting wheel spokes —39—, and having a series of plate lug bars —40— projecting from the wheel rim —38—, and positioned radially thereon. The lug bars —40— being so positioned as to form a contact with the ground only at intervals, propelling the tractor thereby, and without destroying the surface of the soil over which it passes, and replacing the heavily lugged drivers —5— of the tractor. In order to maintain a uniform tension on the drive sprocket chain —31— the extension slides —9— are formed in a circular arc, having a center at the center of the connecting shaft —28—, said slide —9— being held in position by the connecting bar —41—.

In operating my device, by engaging the drive gear —23— with the transmission gear —24—, both of the slides —9— and attached wheels —12— are lowered to the ground through the connecting gearing and to sufficient depth for the projecting lug plates to engage therein, for propelling the tractor over the ground. If desired, when the angularly placed lug wheel is used, the tractor may be entirely lifted from the heavy drive wheels and propelled completely by the secondary device. By closing the clutch gear —36— with the worm —33—, the engine power is transmitted directly to the propelling wheels —12—, or its substitute wheel —43—, driving the tractor by the same power as when used with the heavy tractor wheel.

When my device is designed for pulling heavy loads, it is preferred to replace the heavily lugged drive wheels —5— shown in Fig. 2 of the drawings, with a smooth, flat rimmed wheel —42— without lugs thereon, as indicated in Fig. 1, and the secondary wheel —12— having the angularly projecting plate lugs thereon, with the lug wheel —43— having straight projecting lug plates as shown in Fig. 8. The secondary propelling wheel —43— being lowered by its connecting slide and mechanism until the projecting lugs —44— engage the soil to a sufficient depth for propelling the tractor over the ground, while the weight is carried by the flat rimmed wheels —42—. It is evident that smooth rimmed, or rubber tired wheels may also be used to replace the propelling wheels —12—, if desired, when the tractor is used on paved streets.

Having fully described my secondary propelling device what I claim as my invention and desire to secure by Letters Patent is;

Claims—

1. A secondary propelling device adapted for attaching to a tractor engine for substituting a pair of special propelling wheels in place of the heavy drive wheels of the tractor, comprising a rigid side frame attached to each side of the tractor body, an adjustable sliding bar movably mounted on each of said side frames positioned ahead of the rear drive wheels of the tractor, a special driving wheel mounted on the lower end of each of said sliding bars, a threaded lifting screw attached to the lower end of each of said slides and connected to the tractor frame by a threaded power gear mounted on said screw, geared means connected to said power gear for rotating same, said geared means being connected directly with the engine transmission and operated thereby, geared means attached to each of said wheels and connected to the tractor engine for propelling said wheels directly by power of the tractor engine.

2. A secondary propelling device adapted for substituting a pair of special driving wheels in the place of the heavily lugged drive wheels of the tractor, comprising a pair of rigid side frames, one attached to each side of the tractor body and ahead of the rear tractor drive wheels, a vertical slide mounted on the outside of each of said side frames and ahead of the tractor axle, a secondary driving wheel rotatably mounted on the lower ends of each of said slides, geared means attached to each of said secondary wheels and connected to the engine for propelling said wheels directly from the power of the tractor engine, a vertical lifting screw pivotally attached to the lower end of each of the said slides, said screws being attached to the side frames of the tractor by internally threaded lifting gears mounted on said screws and engaging a frame bearing of the tractor frame, geared means mounted in said engine frame and connected directly to the lifting gears on the lifting screws, said geared means being connected to and operated by the gearing of the engine transmission, and means attached to said gears for engaging same with the transmission gears.

3. A secondary propelling device adapted for substituting a pair of special wheels in place of the heavily lugged drive wheels of the tractor, comprising a rigid frame attached to each side of the tractor body, ahead of the tractor drive axle, a vertical slide mounted on the outside of each of said frames, a secondary driving wheel rotatably mounted on the lower end of each of said slides, a threaded lifting screw attached to the lower end of each slide and connected with the tractor frame by a threaded power gear mounted on said screw and engaging the frame, a drive gear for engaging each of the said power gears, said drive gears being operated by a power shaft directly connected with the tractor engine transmission, and operating for raising or lowering the special drive wheels, a sprocket gear mounted on each of the said special wheels, a special drive shaft having a drive sprocket mounted thereon rotatably mounted within the frame and in alignment with the wheel sprockets, a sprocket chain connecting the sprocket gear and the drive sprocket for transmitting power to the special drive wheels, said special drive shaft being connected to the tractor engine power shaft by geared means, and actuated thereby, for rotating and propelling the special drive wheels, and a clutch mounted within the connecting geared means for engaging and dis-engaging the tractor engine thereto.

In witness whereof I sign this specification.

FRANK PRASZKEWIZ.